April 23, 1968
W. L. DOUGLAS
3,379,167
DISPENSING DEVICE
Filed March 30, 1965
2 Sheets-Sheet 1
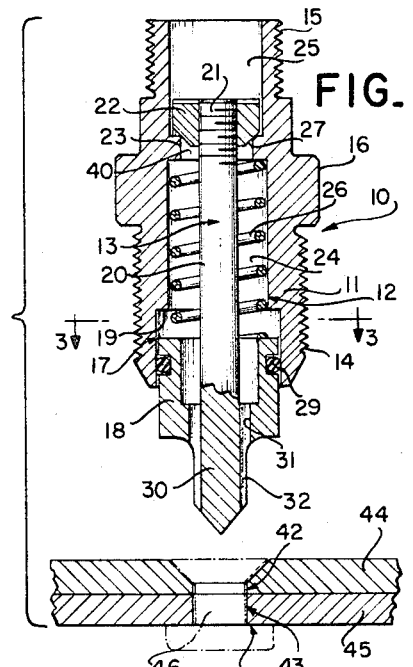
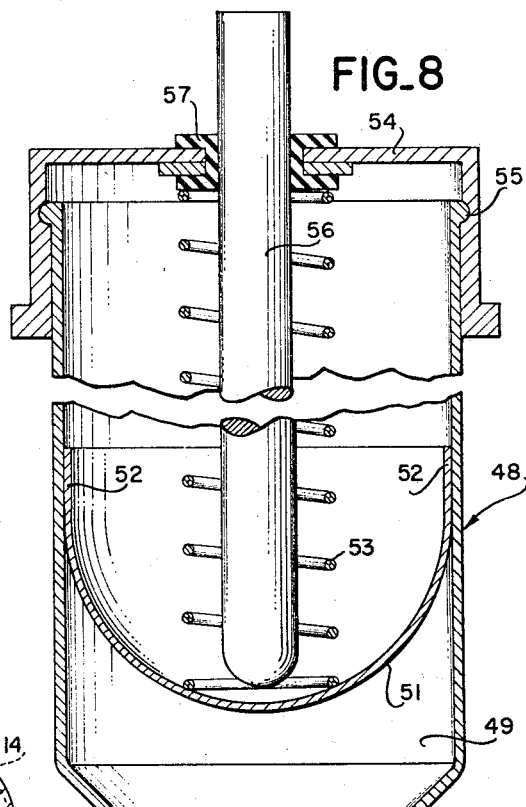
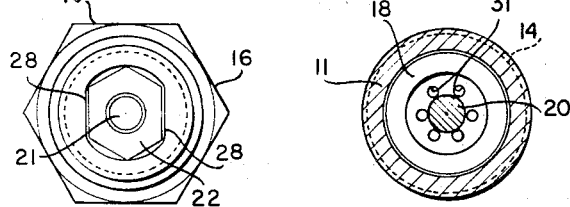
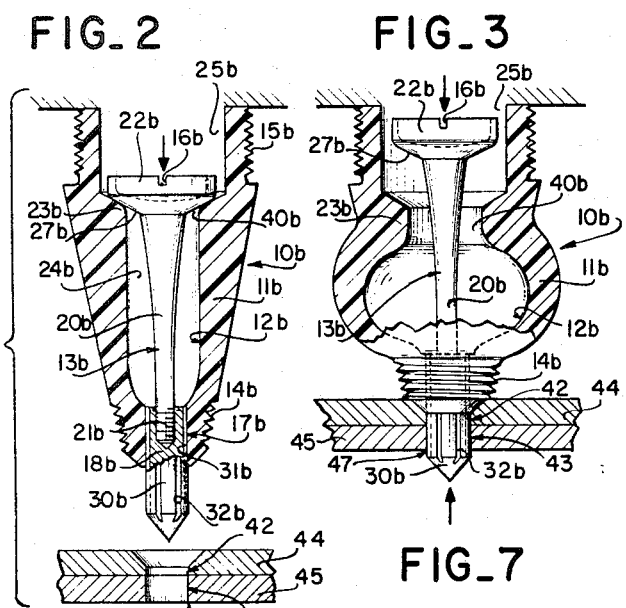
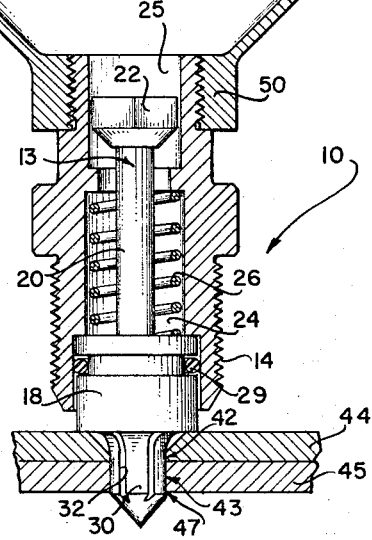
INVENTOR.
WILLIAM L. DOUGLAS
BY George Sullivan
Agent April 23, 1968 — W. L. DOUGLAS — 3,379,167
DISPENSING DEVICE
Filed March 30, 1965 — 2 Sheets-Sheet 2
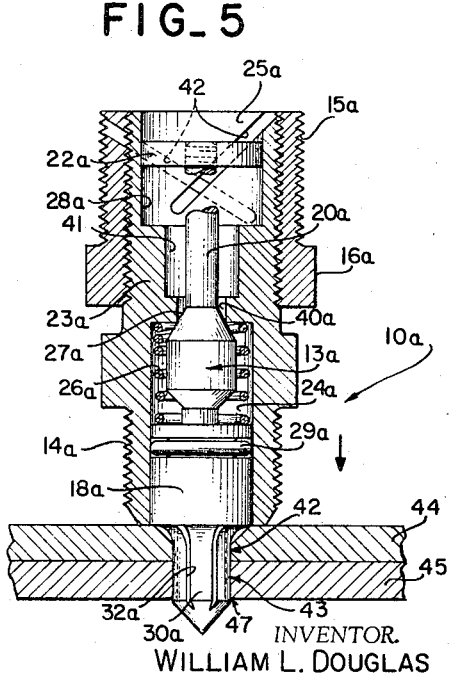
FIG_9
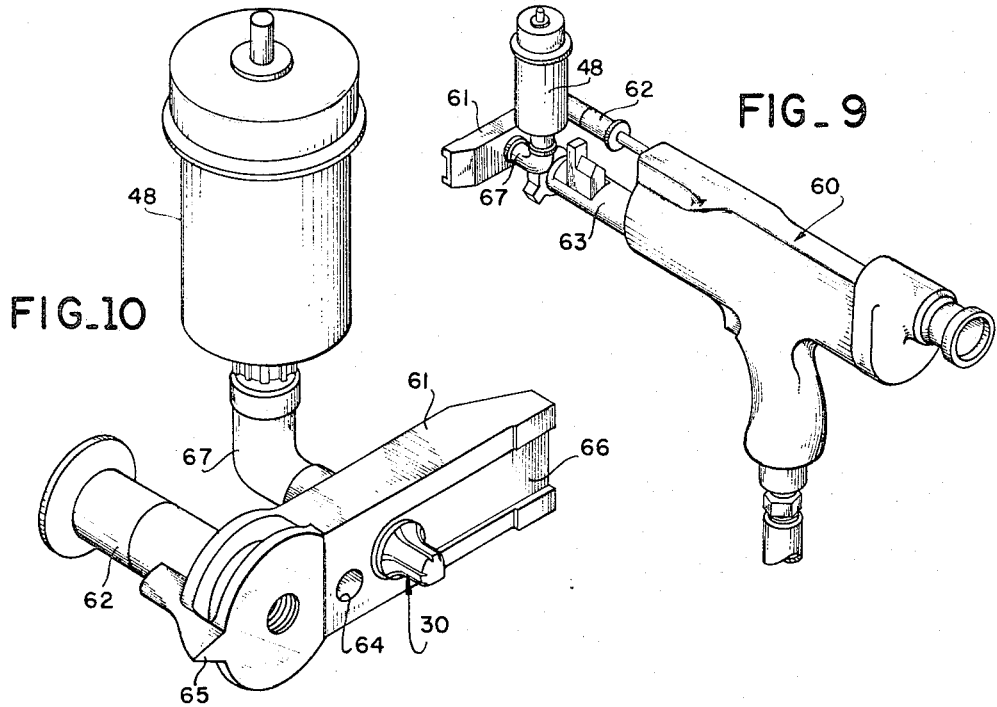
FIG_10
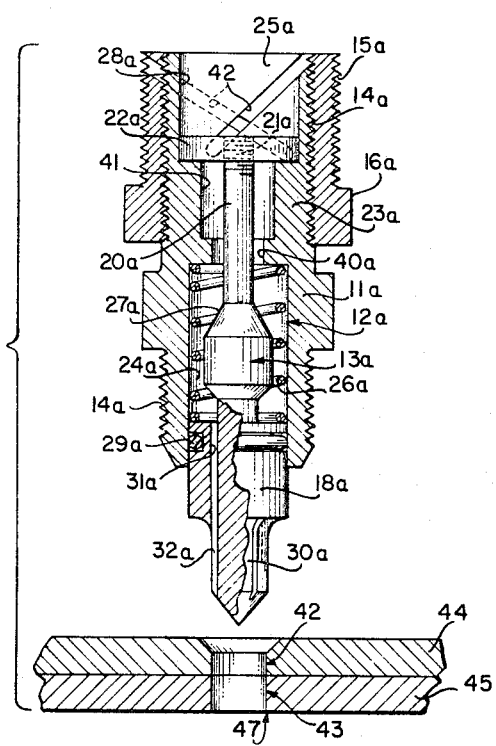
FIG_4   FIG_5
INVENTOR.
WILLIAM L. DOUGLAS
BY George L. Sullivan
Agent United States Patent Office 3,379,167
Patented Apr. 23, 1968

3,379,167
DISPENSING DEVICE
William L. Douglas, Marietta, Ga., assignor to Lockheed Aircraft Corporation, Burbank, Calif.
Filed Mar. 30, 1965, Ser. No. 443,990
17 Claims. (Cl. 118—3)

ABSTRACT OF THE DISCLOSURE

This device provides a mechanical means to apply selected sealants in measured quantities within defined requirements. Application of sealants is accomplished by a controlled method of placing the sealant in fastener holes in such a manner that the labor costs in clean up time are minimized while satisfying the exacting requirements relative to "wet fastener" installations set up by the strictest quality control and manufacturing standards.

This invention relates broadly to devices for dispensing semi-liquid or viscous materials in specific quantities, and more particularly to such a device of improved structural form and operation that is especially adapted for use in the installation of fasteners such as rivets, bolts, etc., in "wet" applications. By "wet" applications is meant installations where a sealant material in semi-liquid or viscous state is applied between the adjacent surfaces of the fastener and the parts joined thereby at the time of or immediately prior to their connection.

Since the inception of all-metal airplanes, the greatest weakness (from a durability and weatherability standpoint) has been in the connection of the skin to the airframe. Due to the aerodynamic configuration of the airplane these skins are necessarily formed by relatively thin and small sheets of metal which must be secured to the airframe by substantially continuous rows of fasteners, usually countersunk rivets, along their marginal edges. The materials, such as aluminum, of these skins are impervious to the elements and present virtually no problem. However, the perforations provided in the skin for the fasteners and the mounting of the fasteners therein have always been troublesome.

Much time and effort has been expended in the design and manufacture of equipment for precise drilling and countersinking of these fastener openings as well as of rivet guns for anchoring the fasteners, and in the training of mechanics, operators and inspectors as well as the development of good quality control methods generally. Nevertheless, these problems continue and improvements in the entire process are still being sought.

One of the more recent important improvements has been the so-called wet riveting concept. Since the edge of skin defining the opening is closed by the rivet when secured therein, the inspection thereof and the detection of flaws created in the process is virtually impossible. Such flaws or damage constitute latent defects that subsequently, through corrosion, result in structural failure. The wet riveting concept envisions a remedy for this through the provision of a protective coating of sealant applied uniformly and totally of the adjacent areas of the rivet and skin edge. This is most effectively accomplished if the rivet is secured while the sealant is wet so that when dried or cured no voids are left.

Following this concept, the practice has developed of dipping each rivet in an anti-corrosive or protective sealant, such as zinc chromate paint, prior to its insertion in a previously prepared opening and immediately securing it in ultimate assembly. Such an operation is hardly conducive to high-speed production, particularly when considering the large number of rivets required in each airplane skin. Moreover, clean up time, i.e., time required to remove the excess sealant, following such installations can be lengthy and surface damage to the skin can result.

The present invention therefore has in view a device for effectively facilitating the wet riveting operation that is especially suited for high-speed production. To that end, this device is not only designed as a self-contained unit but also adapted for incorporation into existing automatic high-speed apparatus where it may be integrated with the total operating sequence whereby each opening in the skin is rapidly cut and prepared and the skin wet riveted into the final assembly.

At the same time, the construction and operation of the device herein proposed is such to insure the total and proper application of the sealant in each successive opening in a reliable and repetitive manner. The assembly and disassembly of its parts permits maintenance and servicing or cleaning of the device in minimum time. Moreover, it is readily adjustable to be applicable to a range of opening sizes and skin thicknesses and to vary the quantity of sealant applied.

More specifically, this dispensing device comprises a housing adapted for connection at one of its ends to a source or supply of sealant and at its other end to conventional automatic drilling and countersinking equipment if desired. Internally the housing is divided into discrete chambers separated by movable partition means to vary the relative capacities thereof. A plunger mounted axially in the housing for relative linear movement therewith is operative upon contraction and extension respectively to open and close communication between the chambers. The outer end of the plunger terminates externally of the housing in an extension pierced by a plurality of passages so that when the device contracts sealant is forced from one chamber to the other and out through the passages in the plunger extension.

The plunger extension has a diameter substantially equal to that of the fastener opening in the parts to be joined and serves as a pilot to concentrically align the plunger with the fastener opening when inserted therein. The length of the extension is such that when thus disposed the outer ends of the passages therein terminate proximate the external surface of the underlying part. All the surfaces of the parts in contact with the rivet when subsequently secured in the opening therein are thereby coated in a substantially uniform manner by the sealant.

With the above and other objects in view as will be apparent, this invention consists in the construction, combination and arrangement of parts all as hereinafter more fully described, claimed and illustrated in the accompanying drawings wherein:

FIGURE 1 is a longitudinal section taken through one embodiment of the invention showing the dispensing device in its normal, inoperative position adjacent a fastener opening in parts to be eventually connected by a rivet, the ultimate position of the rivet being shown in phantom lines;

FIGURE 2 is a top elevation of the dispensing device shown in FIGURE 1;

FIGURE 3 is a section along line 3—3 of FIGURE 1;

FIGURE 4 is a view like FIGURE 1 of another embodiment of the invention;

FIGURE 5 is a similar view showing the dispensing device of FIGURE 4 in its operative position whereby sealant is applied to the surfaces of the parts defining the fastener opening;

FIGURE 6 is a view like FIGURES 1 and 4 of another embodiment of the invention;

FIGURE 7 is a similar view showing the dispensing device of FIGURE 6 in the position corresponding to that of FIGURE 5;

FIGURE 8 is a longitudinal section of the dispensing device illustrated in FIGURE 1 in its operative position corresponding to that of FIGURES 5 and 7 to show how it as well as the devices of FIGURES 5 and 7 may be incorporated with a sealant containing cartridge to produce a self-contained unitary assembly;

FIGURE 9 is an isometric view of a standard high-speed drill and countersink tool to show how the dispensing device herein proposed in any of its forms may be combined therewith; and FIGURE 10 is an isometric view from the opposite direction of that portion of such tool to which the dispensing device is adapted to be connected.

Referring more particularly to the drawings and the form of the invention illustrated in FIGURES 1, 2 and 3, 10 designates a dispensing device constructed in accordance with the teachings hereof. This device 10 is an assembled unit formed by a cylindrical housing or barrel 11 that is axially bored as at 12 to accommodate a plunger 13 coaxially mounted therein for limited reciprocation. For reasons to become more apparent, the opposed ends of the barrel 11 are threaded externally as at 14 and 15 and the central portion thereof is formed with a hexagonal surface 16 to facilitate the rotation thereof.

The outer end of the bore 12 is enlarged as at 17 having a transverse dimension substantially equal to that of a head 18 integrally formed on the outer end of the plunger 13. A step or shoulder 19 is thereby created which abuts the inner end of the head 18 and prevents total retraction of the plunger 13 into the barrel 11.

Medially, the plunger 13 is formed with an axial stem 20 extending inwardly of the bore 12 and terminating in a threaded end 21 complementary to a nut 22. A radial projection 23 is formed or otherwise provided on, to project from, the surface of the barrel 11 defining the bore 12 between the shoulder 19 and the inner end of the barrell 11 to abut the outer surface of the nut 22 and prevent total extension of the plunger 13 out of the barrel 11. This projection 23 also divides the bore 12 into separate sections creating an outer chamber 24 between it and the plunger head 18 and an inner chamber 25 between it and the inner end of the barrel 11. By adjustment of the position of the nut 22 on the stem 20, the effective total reciprocation of the plunger 13 in the barrel 11 and the capacity of the outer chamber 24 is established. To facilitate such adjustment, the inner end of the bore 12 is formed with diametrically opposed flat surfaces 28 complemental to corresponding surfaces of the nut 22 whereby the nut 22 is secured against rotary movement therein.

The position of the plunger 13 is normally maintained fully extended under the action of a compression spring 26 disposed in the bore 12 between the inner end of the head 18 and the outer surface of the projection 23. The outer end of the nut 22 is beveled as at 27 to seat within the restricted opening 40 of the bore 12 defined by the projection 23 when the plunger 13 is in its normal position as above set forth.

The plunger head 18 is grooved adjacent its inner end to accommodate a standard O-ring seal 29 operative between the plunger 13 and the adjacent surface of the barrel 11. At its opposite or outer end the head 18 terminates in an axial extension 30. A plurality of longitudinal passages 31 pierce the head 18 to establish communication between the chamber 24 and the exterior of the device 10. The radial position of each of the passages 31 is such that peripheral grooves 32 are formed on the extension 30 each comprising substantially one-half the transverse dimension of the associated passage 31.

In the form of the invention illustrated in FIGURES 4 and 5, the dispensing device 10a is formed by a barrel 11a that is axially bored as at 12a to accommodate a plunger 13a coaxially mounted therein for limited reciprocation. The opposed ends of the barrel 11a are threaded externally as at 14a and a sleeve is threadably mounted on the inner end thereof. At its inner end this sleeve is externally threaded as at 15a and at its outer end is formed with a hexagonal surface 16a to facilitate its rotation.

Medially of its length the surface of the barrel 11a defining the bore 12a is provided with a radial projection 23a that divides the bore 12a into separate sections creating an outer chamber 24a between it and the inner end of a head 18a integrally formed on the outer end of the plunger 13a and an inner chamber 25a between it and the inner end of the barrel 11a. The plunger 13a is formed with an axial stem 20a extending inwardly of the bore 12a from the head 18a and terminating in a threaded end 21a complementary to a nut 22a. The inner surface of the projection 23a abuts the outer surface of the nut 22a to prevent total extension of the plunger 13a out of the barrel 11a. By adjustment of the nut 22a on the stem 20a, the effective total reciprocation of the plunger 13a in the barrel 11a and the capacity of the outer chamber 24a is established. To facilitate such adjustment, the inner end of the bore 12a is formed with diametrically opposed flat surfaces 28a complemental to corresponding surfaces of the nut 22a which is thereby secured against rotary movement.

The position of the plunger 13a is normally maintained fully extended under the action of a compression spring 26a disposed in the bore 12a between the inner end of the head 18a and a shoulder 19a created by the projection 23a. Medially, the stem 20a is formed with a beveled surface 27a to seat within the restricted opening 40a of the bore 12a defined by the projection 23a when the plunger 13a is fully retracted into the barrel 11a against the normal action of the spring 26a. The peripheral surface of the projection 23a defining the bore 12a between the opening 40a and the nut 22a is offset to define a bore cross section that is greater than that of the opening 40a and less than that of the inner chamber 25a to thereby maintain an intermediate chamber 41 defined inwardly by the nut 22a when the plunger 13a is in its normal position (i.e., fully extended).

By adjustment of the barrel 11a in the sleeve through the threads 14a at its inner end, the capacity of the inner chamber 25a is established. Communication between the exterior and interior of the barrel 11a through the sleeve at the inner end thereof is maintained at all times during such adjustment by means of the angular slots 42 that pierce the wall of the sleeve and barrel 11a defining the inner chamber 25a. Thus, at all positions of adjustment of the barrel 11a in its sleeve, the slots 42 intersect producing an opening in the composite barrel wall.

The plunger head 18a is grooved adjacent its inner end to accommodate a standard O-ring seal 29a operative between the plunger 13a and the adjacent surface of the barrel 11a. At its opposite or outer end the head 18a terminates in an axial extension 30a. A plurality of longitudinal passages 31a pierce the head 18a to establish communication between the chamber 24a and the exterior of the device 10a. The radial position of each of the passages 31a is such that peripheral grooves 32a are formed on the extension 30a each comprising substantially one-half the transverse dimension of the associated passage 31a.

In the form of the invention illustrated in FIGURES 6 and 7, the dispensing device 10b is formed by a barrel 11b that is axially bored as at 12b to accommodate a plunger 13b axially mounted therein. The barrel 11b is threaded externally as at 14b and 15b at its opposed ends. The outer end 17b of the bore 12b has a transverse dimension substantially equal to that of a head 18b threadably mounted on the plunger 13b adjacent its outer end whereby the plunger 13b and barrel 11b are integrally secured to each other to form a unitary structure.

Medially, the plunger 13b is formed with an axial stem 20b threadably mounted at 21a in the head 18b and extending inwardly of the bore 12b where it terminates in an integral enlargement 22b. A radial projection 23b is formed on the surface of the barrel 11b defining the bore 12b adjacent its inner end to abut the outer surface of the enlargement 22b and to limit total extension of the plunger 13b and barrel 11b. This projection 23b also serves to divide the bore 12b into separate sections creating an outer chamber 24b between it and the plunger head 18b and an inner chamber 25b between it and the inner end of the barrel 11b.

The barrel 11b, at least that portion thereof between the threaded ends 14b and 15b, is fabricated of resilient material, preferably a molded synthetic resin, loaded in tension to maintain it normally in the fully extended position. The outer surface of the enlargement 22b is beveled as at 27b to seat within the restricted opening 40b of the bore 12b defined by the projection 23b when the barrel 11b is thus disposed.

At its opposite or outer end the plunger head 18b terminates in an axial extension 30b. A plurality of longitudinal passages 31b pierce the head 18b to establish communication between the bore 12b and the exterior of the device 10b. The radial position of each of the passages 31b is such that peripheral grooves 32b are formed on the extension 30b each comprising substantially one-half the transverse dimension of the associated passage 31b.

Preferably the inner surface of the enlargement 22b is recessed or dished out and slotted transversely to create surfaces 16b to facilitate the rotation of the plunger 13b. The stem 20b is thereby threaded into and unthreaded from the head 18b as desired.

In view of the foregoing structure and arrangement, the dispensing device in any of the forms illustrated and described functions to apply a sealant uniformly to the surfaces 42 and 43 defining an opening in parts 44 and 45 to be interconnected and secured by a fastener such as a rivet 46. The extension 30, 30a or 30b has a transverse dimension substantially equal to the rivet opening to locate the several passages 31, 31a or 31b with their respective grooves 32, 32a or 32b proximate or adjacent the surfaces of the parts 44 and 45 defining the opening. The length of the extension 30, 30a or 30b is such that when the sealant is forced through the passages 31, 31a or 31b by contraction of the device 10, 10a or 10b, it is applied along the entire surface of the opening. At the same time the sealant is also deposited on the surface 47 of the part 45 adjacent the opening so that when the rivet 46 is finally secured the area of the part 45 underlying the head of the rivet 46 is thereby coated and sealed.

Contraction or telescoping of the device 10, 10a or 10b is effected by a force applied thereto in opposition to the resilient member 26, 26a or 26b when the extension 30, 30a or 30b is disposed in the rivet opening. Such force causes an abutment of the plunger head 18, 18a or 18b against the surface of the part 44 adjacent the rivet opening and a compression of the member 26, 26a or 26b. The enlargement 22, 22a or 22b is thereby moved out of contact with the projection 23, 23a or 23b uncovering the restricted opening 40, 40a or 40b and establishing communication between the chambers 24 and 25, 24a and 25a, or 24b and 25b.

The total cross sectional area of the several passages 31, 31a or 31b is sized with relation to that of the restricted opening 40, 40a or 40b to ensure a resulting sealant flow outwardly of the device 10, 10a, or 10b. This will depend upon the mass of the sealant, the effect of gravitational forces acting thereon during operation, etc. Preferably, the aggregate effective cross sectional area of the several passages 31, 31a or 31b is greater than that of the opening 40, 40a or 40b to produce a positive sealant discharge from the extension 30, 30a or 30b. As will become more apparent this discharge may be supplemented by pressurizing the sealant within the chamber 25, 25a or 25b.

Extension of the device 10, 10a or 10b is effected automatically by the operation of the resilient member 26, 26a or 26b upon the release of the force to contract it. At this time a measured quantity of sealant in the inner chamber 25, 25a or 25b on the outer side of the enlargement 22, 22a or 22b is drawn or forced into the outer chamber 24, 24a or 24b for subsequent discharge from the extension 30, 30a or 30b during the next contraction of the device 10, 10a or 10b. The amount of such measured sealant thus discharged with each contraction of the device 10, 10a or 10b can be adjusted by varying the length of the plunger 13, 13a or 13b through the threads 21, 21a or 21b. Additionally, the device 10a allows for adjustment by the location of the intersection between the slots 42 through the positioning of the barrel 11a in its sleeve.

While various known methods and means may be employed to deliver sealant to the inner chamber 25, 25a or 25b of the several dispensing devices 10, 10a or 10b, a relatively uncomplicated and yet reliable unit is illustrated in FIGURE 8. This unit allows each of the dispensing devices 10, 10a and 10b to be completely self-contained and comprises a cartridge 48 containing an internal sealant chamber 49 terminating in a nozzle fitting 50 adapted to receive and threadably connect the respective ends 15, 15a and 15b thereof. At its other end the sealant chamber 49 is defined by a partition 51 having relatively wide outer surface areas 52 adapted to abut the inner wall surfaces of the cartridge 48 in sliding contact therewith. A compression spring 53 is mounted axially of the cartridge 48 between the surface of the partition 51 in opposition to the sealant chamber 49, and the inner wall of a closure cap 54 on the end of the cartridge 48 to thereby apply a constant pressure on the sealant within the chamber 49. The cap 54 is secured in position on the cartridge 48 through suitable positive connection means such as, for example, a clamp engagement as at 55.

The axial position of the spring 53 is maintained by means of and through a guide rod 56 around which the spring is disposed. If desired, the end wall of the cap 54 may be pierced by an opening for the passage of the rod 56 therethrough. To facilitate this, a grommet 57 is employed between the opening in the cap and the rod 56. By extending the rod 56 through the cap 54 auxiliary force-applying means is provided to supplement the action of the spring 53 in compressing the sealant in chamber 49.

FIGURES 9 and 10 show the dispensing device in any of the forms illustrated in FIGURES 1–7 as incorporated in a standard high-speed apparatus currently employed to cut and countersink fastener openings in aircraft skins. In its essentials the illustrated apparatus comprises a hand-operated power tool 60 on which an angular foot 61 is mounted. The foot 61 includes a drill and countersink shank guide 62 through which the drill and countersink element (not shown) passes. Parallel to and adjacent the guide 62 is a power actuator 63 operable to project and retract the foot 61 with respect to the parts 44 and 45 to be eventually secured. With the parts 44 and 45 in overlapped position and the foot 61 in abutment thereagainst, the drill and countersink element operates to cut and prepare a fastener opening therein.

Coaxially mounted within the actuator 63 is a mandrel (not shown), and an indexing hole 64 in the foot 61 in alignment with this mandrel allows its passage therethrough into each fastener opening in the parts 44 and 45 when prepared to serve as an index to locate the next successive opening to be cut. Thus, a series of equally spaced openings are provided in the parts 44 and 45. To facilitate the alignment of such openings a pointer 65 is formed on the foot 61 for use with a line of reference.

In order to adapt the tool 60 to receive and mount a dispensing device 10, 10a or 10b as hereinabove described, the foot 61 is pierced with an opening laterally of the hole 64 outwardly of the guide 62. This opening is threaded internally to receive the threads 14, 14a or 14b of the device 10, 10a or 10b, respectively. Since the operation of the device 10b is the opposite of the devices 10 and 10a, i.e., the barrel 11b thereof reciprocates relative to the plunger 13b, the proper projection of the particular extension 30, 30a or 30b is obtained by different foot thicknesses. To this end the foot 61 may be grooved as at 66. In any case the location of the extension 30, 30a or 30b with reference to the mandrel of the tool 60 is such that when the mandrel is disposed in the second fastener opening, as stated, the drill operates to prepare the third opening and the extension 30, 30a or 30b is mounted in the first opening and concurrently operates to coat the defining surfaces thereof with sealant as hereinabove described. This operation continues until all of the openings in the parts 44 and 45 are prepared and coated. The riveting operation follows.

If desired, an elbow fitting 67 may be employed to mount the cartridge 48 or another sealant container in the vertical position with respect to the tool 50. In such case the threads 15, 15a or 15b of the device 10, 10a or 10b coact with corresponding threads on one end of the fitting 67 and the fitting 59 of the cartridge 48 or other container coacts with complemental means on the other end of the fitting 67.

While particular embodiments of the invention have been illustrated and described herein, it will be obvious to those skilled in the art that various changes and modifications may be made without departing from the invention. The appended claims are intended to cover all such modifications and equivalents that fall within the true spirit and scope of this invention.

What is claimed is:

1. A dispensing device for applying a semi-liquid sealant to surfaces defining a fastener opening comprising a hollow barrel; a pair of chambers internally of said barrel; a plunger axially mounted in said barrel, said barrel and plunger being capable of relative linear movement; coacting means operative between said barrel and said plunger to produce an interconnecting restricted passage between said chambers upon contraction of the barrel and plunger and to isolate said chambers one from the other upon extension of said barrel and plunger; resilient means normally operative to maintain said barrel and plunger in the extended position; an axial extension on said plunger having a length and transverse dimension substantially equal to that of said fastener opening and being provided with a plurality of grooves in its surface; and a passage piercing the outer end of said plunger in communication at one of its ends with one of said chambers and at its other end with each said groove whereby sealant in said one chamber is discharged from said grooves upon contraction of said barrel and plunger.

2. The dispensing device of claim 1 wherein the aggregate cross sectional area of all of the passages in said plunger is greater than that of the interconnecting restricted passage aforesaid.

3. The dispensing device of claim 1 including means to pressurize the sealant in said one chamber.

4. The dispensing device of claim 1 including engagement means adjacent each end of said barrel complemental to coacting means carried by associated equipment for its removable connection thereto.

5. The dispensing device of claim 1 including engagement means carried by said barrel adjacent its end remote from said extension complemental to a fitting of a cartridge containing the sealant aforesaid, and a passage connecting the interiors of said cartridge and the other barrel chamber when said engagement and fitting are operative.

6. The dispensing device of claim 5 wherein said cartridge includes a sealant chamber in communication with said other barrel chamber, a movable partition defining one side of said chamber, and resilient means under compression operative on said partition in opposition to the sealant in said chamber.

7. The dispensing device of claim 5 including engagement means carried by the end of said barrel adjacent said extension for connection to a power actuator whereby operation of said actuator causes contraction of the barrel and plunger.

8. The dispensing device of claim 1 wherein said chambers are located in axial alignment and said coacting means includes a radial projection formed on the inner wall of said barrel and defining a restricted opening between said chambers and a beveled surface carried by said plunger complemental to said restricted opening.

9. The dispensing device of claim 1 wherein said plunger passages and grooves extend longitudinally of the plunger in a common radial plane.

10. The dispensing device of claim 1 wherein said barrel is fabricated of resilient material and said plunger is fabricated of relatively rigid material.

11. The dispensing device of claim 10 wherein said barrel comprises a unitary molded structure and said plunger includes a stem removably secured to the end of said barrel adjacent said extension.

12. The dispensing device of claim 1 wherein said barrel and said plunger comprise rigid structures mounted for relative reciprocation and said resilient means comprises a compression spring disposed therebetween.

13. The dispensing device of claim 1 wherein said axial extension projects outwardly of said barrel whereby a force in excess of that of said resilient means applied thereto telescopes the plunger within the barrel.

14. The dispensing device of claim 1 including adjustable means to vary the relative capacities of said chambers.

15. The dispensing device of claim 1 wherein the end of said barrel remote from said extension includes engagement means for connection thereto of a cartridge containing the sealant aforesaid; an interconnecting slot between the interiors of said cartridge and said other chamber when thus connected; an intermediate chamber between said pair of chambers; and a movable partition separating said intermediate chamber and said other chamber, said partition being carried by said plunger for movement in unison therewith whereby said slot is operatively connected to the interior of said intermediate chamber.

16. The dispensing device of claim 15 including means for adjusting the location of said slot with respect to said other chamber whereby the effective relative capacity of said other chamber and said intermediate chamber is varied.

17. A dispensing device for applying a semi-liquid sealant to surfaces disposed in multiple planes and defining a fastener opening comprising: a hollow barrel; a pair of chambers internally of said barrel; a plunger axially mounted in said barrel and having one end extending externally of said barrel, said barrel and plunger being capable of relative linear movement; coacting means operative between said barrel and said plunger to produce an interconnecting passage between said chambers upon contraction of the barrel and plunger and to isolate said chambers one from the other upon extension of said barrel and plunger; resilient means normally operative to maintain said barrel and plunger in the extended position; said plunger end being shaped to project at least partially into said fastener opening and having an external surface disposed adjacent the multiple plane surfaces aforesaid; at least one passage connecting the interior of one of said barrel chambers with said external surface whereby sealant from said barrel is discharged from said passage onto said multiple plane surfaces upon contraction of said barrel and plunger when said plunger end is in said fastening opening.

References Cited

UNITED STATES PATENTS 2,299,627 10/1942 Hunter et al. _____ 222—501 X
2,823,633 2/1958 Meier et al. _____ 118—3

FOREIGN PATENTS 29,767 9/1907 Austria.

CHARLES A. WILLMUTH, *Primary Examiner.*

R. I. SMITH, *Assistant Examiner.*